United States Patent [19]

Lapp et al.

[11] 4,320,034

[45] Mar. 16, 1982

[54] ELECTRICAL CAPACITOR HAVING AN IMPROVED DIELECTRIC SYSTEM

[75] Inventors: John Lapp; Marco J. Mason; Gary A. Gauger, all of Franklin, Wis.; Hui-Min Chai, Greenwood, S.C.

[73] Assignee: McGraw-Edison Company, Elgin, Ill.

[21] Appl. No.: 84,293

[22] Filed: Oct. 12, 1979

[51] Int. Cl.³ .............................................. H01B 3/48
[52] U.S. Cl. .................................. 252/567; 361/315; 585/6.3
[58] Field of Search ................. 252/63, 567; 361/315; 585/6.3

[56] References Cited

U.S. PATENT DOCUMENTS 4,054,937  10/1977  Mandelcorn et al. ............. 252/63 X

FOREIGN PATENT DOCUMENTS

| 2934103 | 3/1980 | Fed. Rep. of Germany | 252/63 |
| 49-80045 | 8/1974 | Japan | 252/63 |
| 49-109856 | 10/1974 | Japan | 252/63 |
| 50-10500 | 2/1975 | Japan | 252/63 |
| 50-47197 | 4/1975 | Japan | 252/63 |
| 50-86700 | 7/1975 | Japan | 252/63 |

*Primary Examiner*—Mayer Weinblatt
*Attorney, Agent, or Firm*—Andrus, Sceales, Starke & Sawall

[57] ABSTRACT

An electrical capacitor having an improved dielectric system. The capacitor includes layers of metal foil and a dielectric sheet material which is impregnated with a liquid dielectric composition composed of a mixture of methyl diphenyl ethane and a lower alkyl diphenyl.

13 Claims, 6 Drawing Figures

ELECTRICAL CAPACITOR HAVING AN IMPROVED DIELECTRIC SYSTEM

BACKGROUND OF THE INVENTION

In the past, chlorinated biphenyls have seen wide use as dielectric liquids in electrical equipment. The polychlorinated biphenyls are particularly well suited in applications where fire hazards are a problem because of their relatively high fire point. While the polychlorinated biphenyls produce an effective dielectric system for electrical equipment, their usage has provided certain ecological problems, in that the polychlorinated biphenyls are virtually non-biodegradable, with the result, that if leakage or rupture occurs in the electrical equipment, or if the equipment is discarded as obsolete, the polychlorinated biphenyl will remain as a pollutant in the environment and will not degrade to any appreciable extent over extended periods of years.

More recently, a mixture of a mono-halogenated diphenyl oxide and a mono-halogenated alkyl diphenyl oxide, as disclosed in U.S. Pat. No. 4,097,912 has been used as a dielectric liquid for a capacitor. The dielectric system, as disclosed in the aforementioned patent has improved corona characteristics and low dielectric losses and is substantially biodegradable.

U.S. Pat. Nos. 4,054,937 and 3,796,934 disclose liquid dielectrics for capacitors utilizing an alkyl diphenyl. In U.S. Pat. No. 3,796,934, the alkyl diphenyl is combined with a diaryl sulfone, while U.S. Pat. No. 4,054,937 discloses a dielectric liquid composition composed of a mixture of mono and di alkyl derivatives of diphenyl, diphenyl oxide or diphenyl methane.

SUMMARY OF THE INVENTION

The invention relates to an electrical capacitor having an improved dielectric system. The capacitor includes alternate layers of metal foil and a dielectric sheet material, such as polymeric film or Kraft paper. The dielectric sheet material is impregnated with a liquid dielectric composition composed of a mixture of methyl diphenyl ethane and a mono or di-alkyl diphenyl. In addition, the composition may contain small amounts of an anti-oxidant, or an epoxide scavenger.

The capacitor of the invention exhibits low dielectric losses and has a higher discharge inception voltage (DIV) over the normal operating range of $-40°$ C. to $+90°$ C. than most conventional type capacitors.

The dielectric liquid composition, as used in the capacitor of the invention, is less expensive than some conventional dielectric compositions and has the further advantage of being non-halogenated and thus biodegradable, with the result that the composition will decompose into harmless compounds if exposed to the atmosphere through leakage or rupture of the casing, and there are no presently known or foreseen adverse effects on the environment.

The capacitor of the invention is capable of operating under electrical stress at elevated temperatures up to 100° C. without degradation of the dielectric sheet material or the liquid dielectric composition. The increased stability at elevated temperatures enables the dielectric system to be used in large power factor correction capacitors, which generally have an operational temperature range of $-40°$ C. to $+50°$ C. ambient, as well as in smaller ballast or specialty capacitors that may be subjected to operational temperatures up to 100° C.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
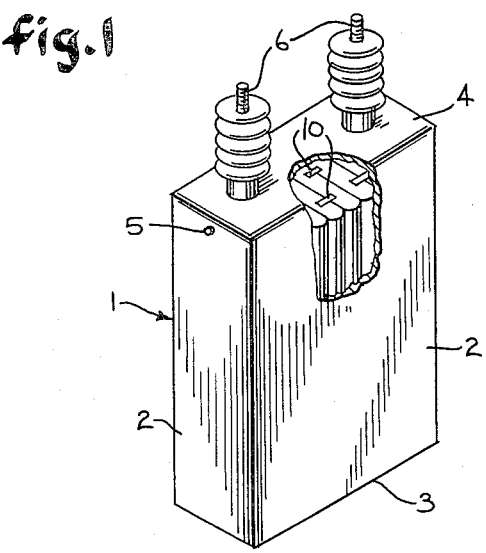
FIG. 1 is a perspective view of a typical capacitor constructed in accordance with the invention.

FIG. 1 illustrates a typical capacitor comprising an outer casing 1 having side walls 2, a bottom wall 3 and a cover 4. In service, the casing is hermetically sealed and is provided with a small seal hole 5 through which the dielectric liquid is introduced into the casing during processing. In addition, a vacuum line can be connected to hole 5 for vacuum drying of the capacitor during processing. A pair of terminals 6 project through the cover 4 and are insulated from the cover.

Figure 2:
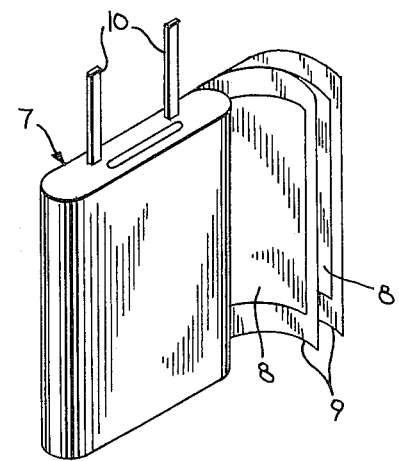
FIG. 2 is a perspective view of a capacitor pack.

As illustrated in FIG. 2, a series of capacitor packs 7 are disposed within the casing 1 and each capacitor peak includes wound layers of metal foil 8 separated by a dielectric layer 9. Electrodes 10 are connected to the foil layers 8 and the electrodes of the various packs are connected together in series for final connection to the terminals 6.

The foil layers 8 can be formed of any desired electrically conductive material, generally a metallic material, such as aluminum, copper, or the like. The layers 8 may be in the form of flat sheets or the layers can be provided with surface irregularities, such as a series of deformations formed by indentations on one side of the foil and corresponding elevations on the other side, as disclosed in U.S. Pat. No. 3,746,953.

The dielectric layers 9 can be composed of a polymeric film, or Kraft paper. The polymeric film can take the form of polypropylene, polyethylene, polyester, polycarbonate, or the like. When using polymeric film, the dielectric layers 9 can be provided with a layer of fine polymeric fibers adhering to the surface of the polymeric film, as disclosed in U.S. Pat. No. 3,772,578.

It is important that the surface of the polymeric film layer 9 and/or the contiguous surface of the metal foil 8, have surface irregularities or deformations, so that the two contiguous surfaces are not in continuous intimate contact. The surface irregularities provide a wicking or capilliary effect for the liquid dielectric enablying the liquid to thoroughly impregnate the polymeric film during processing.

The dielectric layers 9 are impregnated with a liquid dielectric compositions which is composed of a mixture of about 5% to 95% by weight methyl diphenyl ethane and 95% to 5% by weight of mono or di-alkyl diphenyl. A mixture of about 25% to 75% of the methyl diphenyl ethane and 75% to 25% of alkyl diphenyl is preferred.

The methyl diphenyl ethane has the following chemical structure:

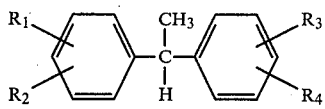

Where $R_1$ is a methyl group, and $R_2$, $R_3$ and $R_4$ are either methyl groups or hydrogen.

The alkyl diphenyl to be used in the dielectric composition has the following structural formula:

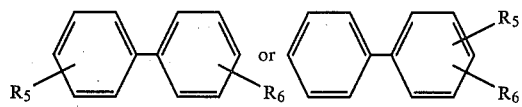

where $R_5$ is an alkyl group containing 1 to 4 carbon atoms, and $R_6$ is an alkyl group containing 1 to 4 carbon atoms or is hydrogen. Mono or di-propyl diphenyls are preferred, and both normal propyl and isopropyl derivatives can be utilized.

No special procedures are required for mixing the two components of the liquid dielectric composition and they are miscible at room temperature or elevated temperatures.

The dielectric composition can also include from 0.01% to 10.0% by weight, and preferably from about 0.2% to 1.5% by weight of an epoxide scavenger which will act to neutralize decomposition products that are released from or generated from the liquid impregnant and other materials in the capacitor during its operation. The neutralizing agents or scavengers can take the form of 1,2-epoxy-3-phenoxypropane; bis(3,4-epoxy-6-methycylohexylmethyl) adiptate; 1-epoxyethyl-3,4-epoxycyclohexane; 3,4-epoxycyclohexylmethyl-3,4-epoxycyclohexanecarboxylate; 3,4-epoxy-6-methylcyclohexylmethyl-3,4-epoxy-6-methylcyclohexanecarboxylate; and mixtures thereof. The epoxy compounds are effective to rapidly-neutralize decomposition products, thereby improving the dielectric properties and service life of the capacitor.

The dielectric composition can also include up to about 5.0% of an anti-oxidant, and preferably about 0.01% to about 0.2%. Anti-oxidants that can be used are di-t-butylphenol, di-t-butyl-paracresol, and the like.

In addition, the dielectric composition can also contain up to about 2%, and preferably about 0.01% to 0.5% of an agent to improve the corona resistance, such as anthraquinone, Beta-methylanthraquinone or Beta-chloranthraquinone.

In processing the capacitor of the invention, the capacitor casing containing the capacitor packs is initially vacuum dried at a temperature preferably less that 60° C. for a period of time sufficient to remove water vapor and other gases from the interior of the capacitor. A vacuum less than 500 microns is usually employed, and preferably below 100 microns, and a drying period longer than 40 hours is customary, although the time period depends on the magnitude of the vacuum.

The liquid dielectric composition is separately subjected to a vacuum treatment to remove gases, and in this degassing treatment, a vacuum less than 100 microns is utilized, with a vacuum less than 50 microns being preferred. To accelerate the degassing, the liquid can be agitated either by circulating the liquid through a closed system, or subjecting it to stirring or mixing action. The time of degassing depends upon the viscosity of the liquid, the magnitude of the vacuum and the type of agitation. In general, the liquid is subjected to the vacuum treatment for a period in excess of 12 hours and during degassing is maintained at a temperature below 60° C. and preferably at room temperature.

The degassed dielectric liquid composition is then introduced into the capacitor casing and a positive pressure in the range of about 0.1 to 5.0 psig is applied to the dielectric liquid. The positive pressure will result in the walls of the casing being bulged or expanded, within its elastic limit, to provide a slight increase in volume in the interior of the casing. The positive pressure is maintained on the liquid for a period in excess of 24 hours and the casing is thereafter sealed while maintaining some positive pressure.

After sealing, the capacitor is subjected to an elevated temperature, of about 65° C., for a period in excess of 24 hours to insure impregnation of the dielectric layers by the liquid dielectric composition.

The application of the positive pressure on the liquid in the casing is an important factor in the processing. The liquid dielectric composition has a coefficient of thermal expansion approximately ten times greater than that of the metal casing of the capacitor. When the capacitor is exposed in service to extremely low temperatures, the shrinkage in volume of the liquid will be compensated for by the contraction of the expanded casing, so that a vacuum is not created in the casing at low temperatures. If the casing is sealed off under either negative or atmospheric pressure, cooling of the capacitor in service will create a shrinkage in the liquid volume and a partial vacuum within the casing is possible. The partial vacuum can reduce the discharge inception voltage (DIV) and the discharge extinction voltage (DEV). Since damage caused by partial discharges may be cumulative, premature failure of a capacitor may result. Thus, the application of a positive pressure to the liquid serves an important function of expanding the casing, so that the shrinkage in volume of the liquid, when the capacitor is cooled, will be compensated for by the contraction of the casing, thereby preventing the creation of a vacuum within the casing.

As an example of processing the capacitor of the invention, a capacitor was constructed having an approximate casing size of $3\frac{1}{2}" \times 5" \times 25"$ and containing capacitor packs formed of alternate layers of two sheets of polypropylene film having a 1.5 mil total thickness and aluminum foil having a thickness of 0.22 mil. A layer of Kraft paper insulation was applied to the inner wall of the casing.

The capacitor casing was initially preheated to a temperature of 50° C. and thereafter subjected to a vacuum less than 100 microns for a period of 48 hours while maintaining the 50° C. temperature. The casing was then disconnected from the vacuum line and after that it was permitted to cool to room temperature. The capacitor was then connected to a vacuum line of an impregnator and maintained at a vacuum of less than 100 microns for a period of 24 hours, at room temperature, to complete the drying of the capacitor.

A dielectric liquid composition composed of approximately 33% by weight of 1,1-bis(3,4-dimethylphenyl) ethane (DXE, Gulf Oil Chemicals Co.) and 67% by weight of iso-propyl diphenyl (Sun X-489-17), Sun Oil Co.) was separately degassed by subjecting the liquid at room temperature to a vacuum of less than 100 microns while circulating the fluid for a period of over 12 hours through a closed system. After degassing, the dielectric composition was pumped into the degassed casing and a positive pressure of 0.5 psig was applied to the liquid. The liquid was maintained under this positive pressure for a period of 72 hours at room temperature. The pressure caused the walls of the casing to expand to provide an increase in casing volume of approximately 10%. The casing was sealed while maintaining the positive pressure.

After sealing, the capacitor was disconnected from the pressure line and heated to a temperature of 65° C. for a period of about 44 hours to insure impregnation of the polypropylene film by the liquid dielectric.

Figure 3:
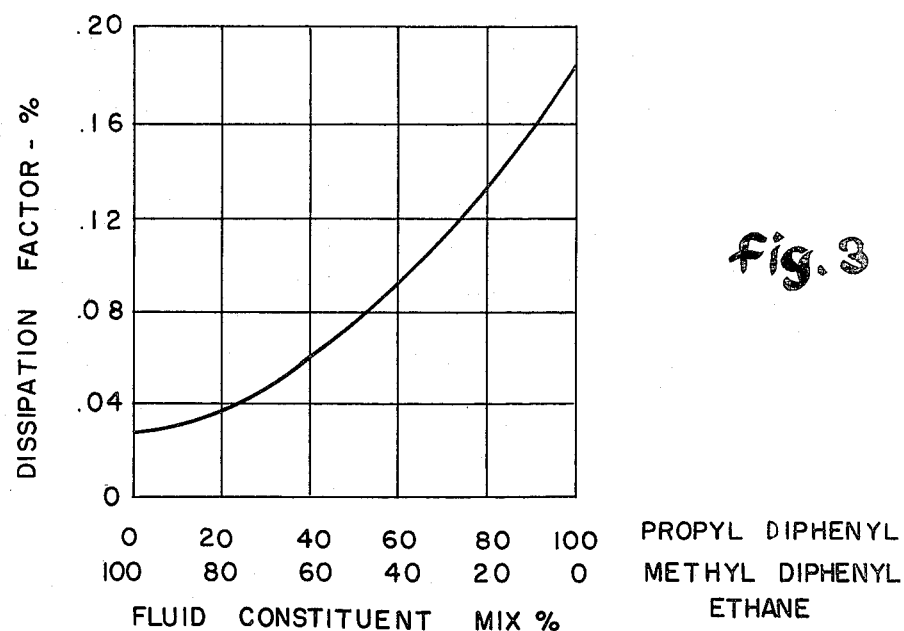
FIG. 3 is a graph showing the dissipation factor of various mixtures of methyl diphenyl ethane and propyl diphenyl in the liquid dielectric composition.

The dielectric composition used in the capacitor has low dielectric losses, as illustrated in the graph shown in FIG. 3. This graph plots the dissipation factor against various constituent mixtures of 1,1-bis(3,4-dimethylphenyl) ethane (DXE, Gulf Oil Chemicals Co.) and iso-propyl diphenyl (SUN X-489-17, Sun Oil Co.). The dissipation factor was determined using a Balsbaugh cell and ASTM-D-924 test procedure. The test was run at 500 volts with a 50 mil gap between the casing and the central electrode of the cell. The results, as illustrated in FIG. 3, show that the dissipation factor of mixtures of methyl diphenyl ethane and propyl diphenyl decrease as the percentage of methyl diphenyl ethane increases. This indicates that the composition of this invention has extremely low dielectric losses.

Figure 5:
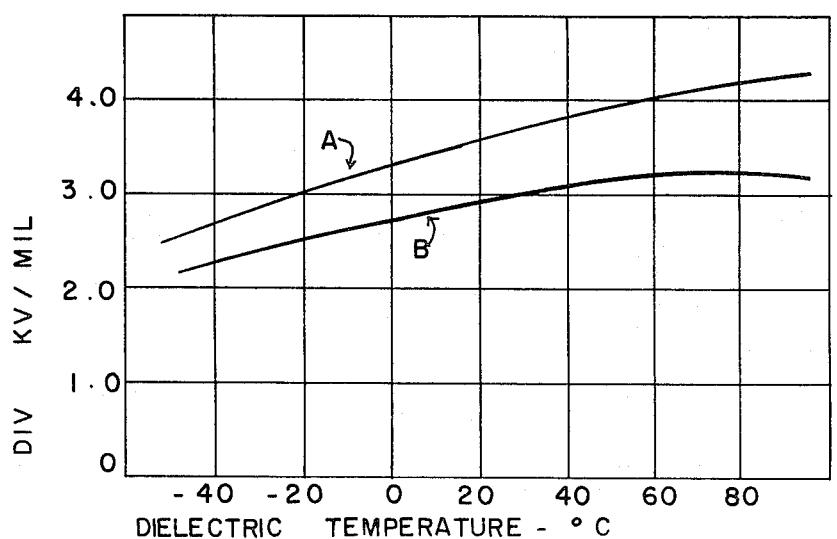
FIG. 5 is a graph comparing the discharge inception voltage (DIV) of the dielectric liquid composition of the invention with that of a mixture of monochlorodiphenyl oxide and butylmonochlorodiphenyl oxide over the temperature range of $-40°$ C. to $+90°$ C.

The capacitor of the invention has excellent partial discharge characteristics, as illustrated in FIG. 5, which compares the discharge inception voltage (DIV) of a miniature capacitor made in accordance with the invention and utilizing 25% by weight of 1,1-bis(3,4-dimethylphenyl) ethane (DXE, Gulf Oil Chemicals Co.) and iso-propyl diphenyl (SUN X-489-17, Sun Oil Company), with a similar miniature capacitor utilizing a mixture of about 17% by weight of mono-chlorodiphenyl oxide and 83% by weight of butylmonochlorodiphenyl oxide, as the liquid impregnant.

All of the capacitor samples included polypropylene film having a total thickness of 1.0 mil and deformed aluminum foil having a nominal thickness of 0.25 mils. The polypropylene film and the foil were wound convolutely in packs and inserted in steel casings which were vacuum dried at 20° C. for 120 hours at a vacuum of about 20 microns. The dielectric liquid in each case was separately vacuum degassed at room temperature for 48 hours at a vacuum less than 100 microns. The dielectric liquids were introduced into the respective capacitor casings and held at room temperature for 96 hours under a vacuum of about 20 microns. After this period of soaking, the vacuum was released and the capacitors were sealed.

The capacitor samples were operated under electrical stress at room temperature for a period of more than 500 hours at 1000 volts per mil. After this operating period, the DIV was determined at various temperatures from −40° C. to +90° C.

The curves in FIG. 5 show that the sample capacitors of the invention (Curve A) had a higher DIV over the entire temperature range than similar sample capacitors using the mixture of monochlorodiphenyl oxides (Curve B). The increased DIV of the capacitor of the invention provides an improved safety margin, insuring that the normal operational stress will be well below the corona voltage. Conversely, the improved corona characteristics of the capacitor of the invention will permit an increase in the number of volts per mil without a sacrifice in the ratio of DIV to operating stress.

Figure 4:
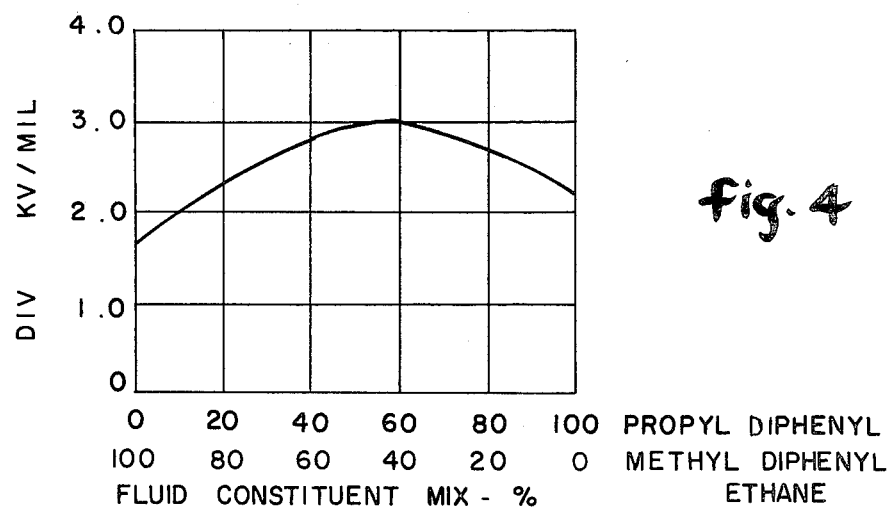
FIG. 4 is a graph showing the discharge inception voltage (DIV) at $-40°$ C. of various mixtures of methyl diphenyl ethane and propyl diphenyl.

It has been found that capacitors using the combination of methyl diphenyl ethane and alkyl diphenyl as the liquid impregnant exhibit an unusual and unexpected increase in the DIV at extremely low operating temperatures, as compared to similar capacitors using the individual components as the liquid dielectric. In this regard, FIG. 4 is a graph plotting the DIV of capacitors utilizing various mixtures of 1,1-bis(3,4-dimethylphenyl) ethane (DXE, Gulf Oil Chemicals Co.) and iso-propyl diphenyl (SUN X-489-17, Sun Oil Co.) at −40° C. The capacitors were processed in the same manner as previously outlined in connection with the data appearing in the graph of FIG. 5.

From the curve in FIG. 4, it can be seen that capacitors using 100% of the Methyl diphenyl ethane as the liquid dielectric and a DIV of approximately 1.7 Kv/mil at −40° C., while capacitors using 100% of the isopropyl diphenyl had a DIV of approximately 2.3 Kv/mil at the same temperature. However, quite unexpectedly, mixtures of the two provided a substantially greater DIV, with the DIV of capacitors using a 50-50 mixture being above 3.0 Kv/mil. This increase in the DIV at extremely low temperatures, over and above that of either of the individual components, is an unusual and completely unexpected advantage.

Figure 6:
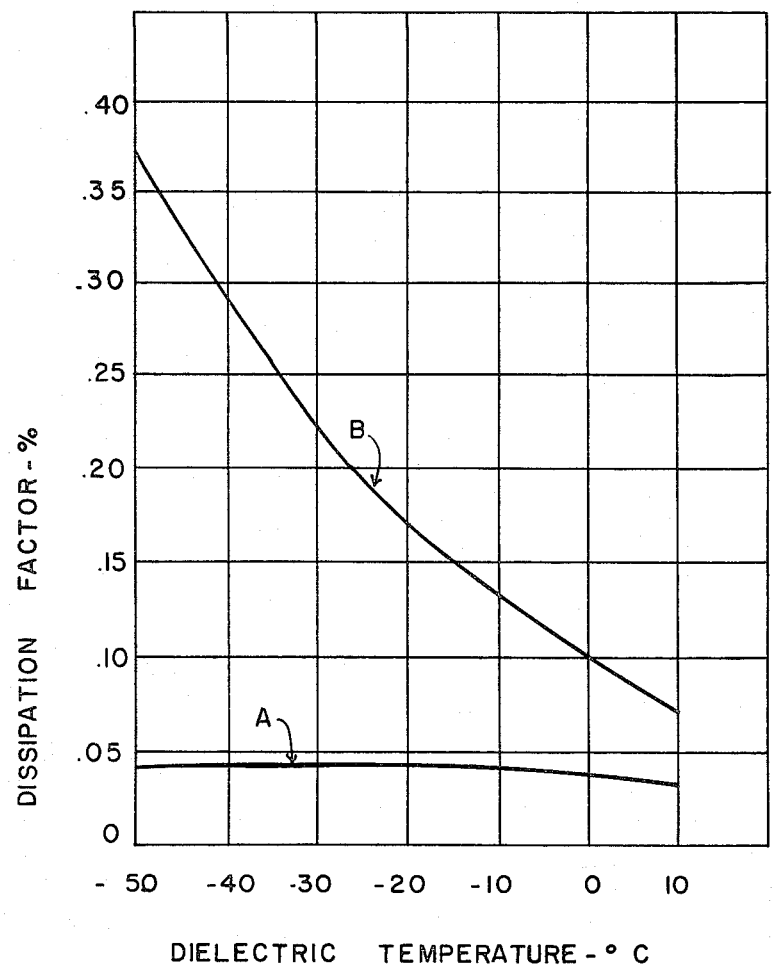
FIG. 6 is a graph comparing the dissipation factor of the dielectric composition of the invention with that of a mixture of monochlorodiphenyl oxide and butylmonochlorodiphenyl oxide over the temperature range of $-50°$ C. to $+10°$ C.

FIG. 6 compares the dissipation factors of the miniature capacitors described above in connection with FIG. 5. The capacitors of the invention (Curve A) had a relatively constant dissipation factor throughout the entire range of temperatures from −50° C. to +10° C. On the other hand, the capacitors utilizing the mixture of monochlorodiphenyl oxides as the impregnant, as shown by Curve B, had a very high dissipation factor at −50° C., which decreases rapidly with an increase in temperature. This data shows the extremely low dielectric losses exhibited by the capacitor of the invention, particularly at low temperatures.

The capacitor of the invention has a relatively high DIV over the entire normal operating temperature range, thereby providing good corona characteristics and exhibiting low dielectric losses. The higher DIV results in an increased safety margin, insuring that the volts per mil will be well below the DIV, or alternately, permitting an increase in the volts per mil without a decrease in the safety margin. At extremely low operating temperatures, in the range of −40° C., capacitors using mixtures of methyl diphenyl ethane and the alkyl diphenyl exhibit an unexpected increase in DIV, as compared to the DIV of capacitors using the individual components as the liquid dielectric.

The capacitor of the invention also has extremely low dielectric losses, particularly at lower temperatures.

As the components of the liquid dielectric composition are biodegradable, no environmental problems are encountered in the disposal of the dielectric liquid composition.

As a further advantage, the dielectric composition of the invention has fuel value, if discarded. As neither of the ingredients of the composition is halogenated, there is no problem of corrosion of the combustion apparatus or environmental pollution through burning of the composition.

Various modes of carrying out the invention are contemplated as being within the scope of the following claims particularly pointing out and distinctly claiming the subject matter which is regarded as the invention.

We claim:

1. An electrical capacitor comprising an outer casing, and a capacitor pack disposed in the casing having alternate layers of metal foil and a dielectric material, said dielectric material being impregnated with a dielectric liquid composition which comprises from about 5% to 95% by weight of a diphenyl ethane with at least one of the phenyl groups having a dimethyl substitution, and the balance being propyl diphenyl.

2. The capacitor of claim 1, wherein said dielectric layer is selected from the group consisting of polymeric film, paper and mixtures thereof.

3. The capacitor of claim 1, wherein the propyl diphenyl is iso-propyl.

4. The capacitor of claim 1, wherein the propyl diphenyl is normal propyl.

5. The capacitor of claim 1, wherein said dielectric liquid includes up to about 10% by weight of an epoxide scavenger.

6. The capacitor of claim 1, wherein said liquid dielectric composition contains from about 0.01% to 0.20% by weight of an anti-oxidant.

7. The capacitor of claim 1 wherein said capacitor has a discharge inception voltage greater than 1.7 KV/mil at all temperatures from $-40°$ to $+90°$ C.

8. The capacitor of claim 1 wherein said dielectric liquid composition in said casing is under a positive pressure in the range of 0.1 to 5.0 psig at room temperature.

9. The capacitor of claim 1 wherein said dielectric liquid composition in said casing is under a positive pressure at all temperatures from $-40°$ to $+90°$ C.

10. An electrical capacitor comprising an outer casing, and a capacitor pack disposed in the casing having alternate layers of metal foil and dielectric material, said dielectric material being impregnated with a dielectric liquid composition which comprises from about 5% to 95% by weight of 1,1-bis(3,4-dimethylphenyl) ethane, and 95% to 5% by weight of propyl diphenyl.

11. The capacitor of claim 10, wherein the dielectric layers are polymeric film.

12. The capacitor of claim 10, wherein the propyl diphenyl is iso-propyl diphenyl.

13. The capacitor of claim 10 wherein said capacitor has a dissipation factor of less than 0.1% at all temperatures from $-40°$ to $+90°$ C.

* * * * *